(12) United States Patent
Yuan et al.

(10) Patent No.: US 8,407,772 B2
(45) Date of Patent: Mar. 26, 2013

(54) METHOD, DEVICE, AND SYSTEM FOR ISSUING LICENSE

(75) Inventors: Weizhong Yuan, Shenzhen (CN); Renzhou Zhang, Nanjing (CN); Chen Huang, Nanjing (CN); Zhipeng Zhou, Nanjing (CN); Qingliang Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 13/281,191

(22) Filed: Oct. 25, 2011

(65) Prior Publication Data

US 2012/0042168 A1    Feb. 16, 2012

Related U.S. Application Data

(63) Continuation of application No. PCT/CN2009/071503, filed on Apr. 27, 2009.

(51) Int. Cl.
*H04L 29/06* (2006.01)
(52) U.S. Cl. .................................................... 726/6
(58) Field of Classification Search .................. 726/26
See application file for complete search history.

(56) References Cited

U.S. PATENT DOCUMENTS

| | | | | |
|---|---|---|---|---|
| 6,772,133 B1 * | 8/2004 | Kambayashi et al. | ......... | 705/57 |
| 6,772,340 B1 * | 8/2004 | Peinado et al. | ............... | 713/168 |
| 7,477,749 B2 * | 1/2009 | Pippuri | ......................... | 380/284 |
| 7,711,647 B2 * | 5/2010 | Gunaseelan et al. | ............ | 705/59 |
| 7,792,517 B2 * | 9/2010 | Mowry et al. | ................. | 455/410 |
| 7,801,820 B2 * | 9/2010 | Molaro | ........................... | 705/59 |
| 8,095,466 B2 * | 1/2012 | Kahn et al. | ...................... | 705/51 |
| 8,214,644 B2 * | 7/2012 | Chu et al. | ...................... | 713/170 |
| 8,327,145 B2 * | 12/2012 | Kim | .............................. | 713/171 |
| 8,336,105 B2 * | 12/2012 | Hartung et al. | ................. | 726/27 |
| 2003/0187799 A1 | 10/2003 | Sellars et al. | | |
| 2004/0168184 A1 * | 8/2004 | Steenkamp et al. | ............ | 725/31 |
| 2005/0021783 A1 | 1/2005 | Ishii | | |
| 2005/0044046 A1 * | 2/2005 | Ishiguro | ......................... | 705/57 |
| 2005/0080746 A1 | 4/2005 | Zhu et al. | | |
| 2005/0138357 A1 | 6/2005 | Swenson et al. | | |
| 2005/0209972 A1 * | 9/2005 | Bjorkengren et al. | .......... | 705/57 |

(Continued)

FOREIGN PATENT DOCUMENTS

| | | |
|---|---|---|
| CN | 1496627 A | 5/2004 |
| CN | 1607762 A | 4/2005 |

(Continued)

OTHER PUBLICATIONS

International Search Report issued in corresponding PCT Application No. PCT/CN2009/071503; mailed Feb. 4, 2010.

(Continued)

*Primary Examiner* — Edan Orgad
*Assistant Examiner* — James Turchen
(74) *Attorney, Agent, or Firm* — Brinks Hofer Gilson & Lione

(57) ABSTRACT

A system for issuing a license includes a Content Issuer (CI) configured to receive a Cooperate-RORequest from a Rights Issuer (RI). The CI encapsulates, according to the information carried in the Cooperate-RORequest, content related information by using a key of a destination entity to obtain an encapsulation key, and generates a Message Authentication Code (MAC) on part of information of a license. The CI sends the generated MAC and obtained encapsulation key to the RI, so that the RI sends the license that includes the MAC and the encapsulation key to the destination entity.

13 Claims, 13 Drawing Sheets

U.S. PATENT DOCUMENTS

| | | | |
|---|---|---|---|
| 2005/0210277 A1* | 9/2005 | Nagai et al. | 713/193 |
| 2007/0112680 A1* | 5/2007 | van Niekerk et al. | 705/57 |
| 2007/0157318 A1* | 7/2007 | Lee et al. | 726/27 |
| 2007/0168294 A1* | 7/2007 | Tsurukawa | 705/59 |
| 2007/0172065 A1* | 7/2007 | Lee et al. | 380/259 |
| 2008/0046271 A1* | 2/2008 | Jeong et al. | 705/1 |
| 2008/0046758 A1* | 2/2008 | Cha et al. | 713/189 |
| 2008/0310637 A1* | 12/2008 | Li et al. | 380/278 |
| 2008/0319851 A1* | 12/2008 | Grigorovitch et al. | 705/14 |
| 2010/0031366 A1* | 2/2010 | Knight et al. | 726/26 |

FOREIGN PATENT DOCUMENTS

| | | |
|---|---|---|
| CN | 1851604 A | 10/2006 |
| WO | 2008/087743 A1 | 7/2008 |
| WO | 2008/088163 A1 | 7/2008 |

OTHER PUBLICATIONS

Office Action issued in corresponding Chinese Patent Application No. 200980147164.4, mailed Dec. 26, 2012.

* cited by examiner

METHOD, DEVICE, AND SYSTEM FOR ISSUING LICENSE

CROSS-REFERENCE TO RELATED APPLICATIONS

This application is a continuation of International Application No. PCT/CN2009/071503, filed on Apr. 27, 2009, which is hereby incorporated by reference in its entirety.

FIELD OF THE APPLICATION

The present application relates to the field of digital rights protection technologies, and in particular, to a method, device, and system for issuing a license.

BACKGROUND OF THE APPLICATION

Digital Rights Management (DRM) controls use of digital content by using a rights restriction and content protection solution, and thus protecting legitimate interests of content owners. After a Content Issuer (CI) or a Content Provider (CP) encrypts the digital content, a user downloads an encrypted digital content package to a destination entity; a Rights Issuer (RI) or a license server is responsible for issuing a license corresponding to the content package, where the license includes a content decryption key and corresponding rights. The destination entity can normally use the digital content when possessing both the content package and the license.

SUMMARY OF THE APPLICATION

An embodiment of the present application provides a license issuing method, including:
receiving, by a CI, a Cooperate-RORequest from an RI;
encapsulating, by the CI, according to information carried in the Cooperate-RORequest, content related information by using a key of a destination entity to obtain an encapsulation key, and generating a Message Authentication Code (MAC) on part of information of a license; and
sending, by the CI, the generated MAC and obtained encapsulation key to the RI, so that the RI sends the license that includes the MAC and the encapsulation key to the destination entity.

An embodiment of the present application provides a content issuing device, including:
a request receiving unit, configured to receive a Cooperate-RORequest from an RI;
a cooperating unit, configured to encapsulate, according to information carried in the Cooperate-RORequest, content related information by using a key of a destination entity to obtain an encapsulation key, and generate a MAC on part of information of a license; and
a response sending unit, configured to send the MAC generated by the cooperating unit and the encapsulation key obtained by the cooperating unit to the RI, so that the RI sends the license that includes the MAC and the encapsulation key to the destination entity.

An embodiment of the present application provides a license issuing device, including:
a request sending unit, configured to send a Cooperate-RORequest to a CI;
a response receiving unit, configured to receive an encapsulation key, which the CI obtains by encapsulating, according to the Cooperate-RORequest sent by the request sending unit, content related information and using a key of a destination entity, and a MAC that the CI generates on part of information of a license; and
a license sending unit, configured to send the license that includes the MAC and encapsulation key that are received by the response receiving unit to the destination entity.

An embodiment of the present application provides a license issuing system, including:
a CI, configured to: receive a Cooperate-RORequest from an RI, encapsulate, according to information carried in the Cooperate-RORequest, content related information by using a key of a destination entity to obtain an encapsulation key, and generate a MAC on part of information of a license; and send the generated MAC and the obtained encapsulation key to the RI; and
the RI, configured to: send the Cooperate-RORequest to the CI; receive the MAC and the encapsulation key that are sent by the CI; and send the license that includes the MAC and the encapsulation key to the destination entity.

In the foregoing technical solutions provided in the embodiments of the present application, the CI encapsulates, according to the Cooperate-RORequest from the RI, content related information by using the key of the destination entity to obtain an encapsulation key, and generates a MAC on part of information of a license; the RI sends the license that includes the MAC and the encapsulation key to the destination entity. Because the RI is unable to decrypt the encapsulation key, the encapsulation key is confidential to the RI. In addition, the MAC protects the integrity of part of information of the license. Thus, the RI is effectively prevented from tampering with information in the license including rights, and forging the license. Therefore, the CI implements effective control on the license issuing of the RI.

BRIEF DESCRIPTION OF THE DRAWINGS

To make the technical solutions in the embodiments of the present application or in the prior art clearer, accompanying drawings for illustrating the embodiments of the present application or the prior art are outlined below. Apparently, the accompanying drawings described below are only some exemplary embodiments of the present application, and those of ordinary skill in the art may derive other drawings from such accompanying drawings without creative efforts.

DETAILED DESCRIPTION OF THE EMBODIMENTS

The following describes the technical solutions of the present application with reference to the accompanying drawings and exemplary embodiments. It is understandable that the embodiments of the present application are exemplary and not intended to limit the scope of the present application. The scope of the present application is defined by the claims.

During the implementation of the present application, the inventor discovers the following problems in the prior art: In a digital rights protection system in the prior art, when a CI and an RI belong to different commercial entities or belong to a parent company and subsidiary respectively, the CI cannot obtain accurate issuing circumstances of digital content from the RI, including user and rights information included in the license. The management on the commercial entities to which the CI belongs cannot be performed effectively. The actual issuing circumstances of the digital content cannot be referred to as references when charging is performed or commercial contracts are formulated. Thus, effective control or supervision on the RI cannot be performed, and interests of the commercial entities cannot be fully protected.

Figure 1:
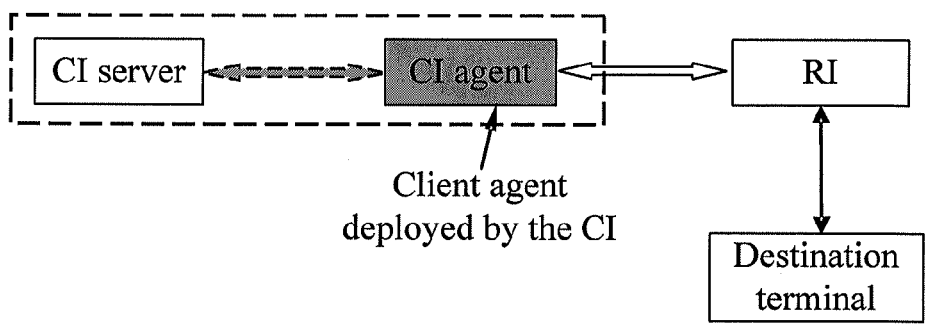
FIG. 1 is a schematic architecture diagram of a license issuing system according to an embodiment of the present application.

In the embodiments of the present application, the CI participates in the processes of encapsulating and issuing a license by the RI; the CI is responsible for encapsulating key part of the license; and the RI is responsible for issuing the license. In this way, the CI controls the RI in issuing the license. To enable flexible deployment and respond to an RI request immediately, the CI is divided into a CI server and a CI agent according to the functions. The CI server is deployed on a Local Area Network (LAN) where the CI is located, and the CI agent may be deployed on the LAN where the RI is located. In view of various factors such as security and controllability and manageability, the preferred CI agent deployment solution is as follows: The CI agent is installed on an independent machine or a logically independent virtual machine. FIG. 1 is a schematic architecture diagram of a system according to an embodiment of the present application.

Figure 2:
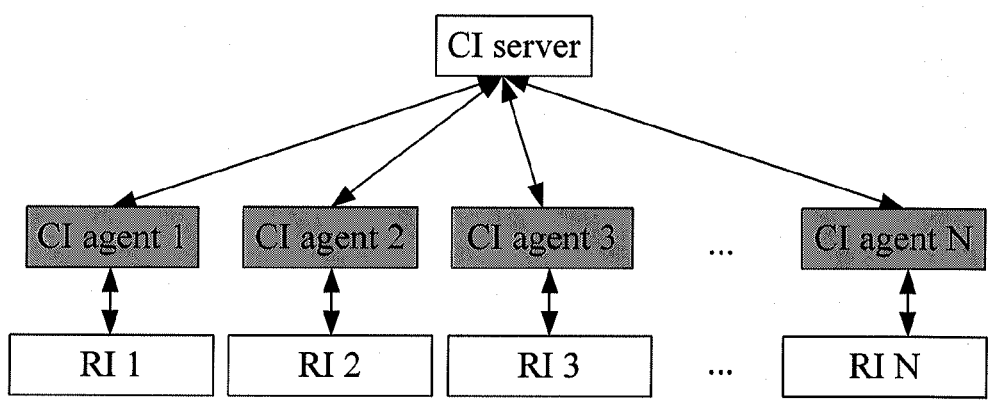
FIG. 2 is a schematic topologic structural diagram of a license issuing system according to an embodiment of the present application.

In the schematic architecture diagram of the system mentioned above, the CI possesses complete control rights and management rights over the CI server and CI agent. The CI server may be deployed on the CI, while the CI agent may be deployed on different RIs according to service requirements. Certain customization or modification may be performed on the corresponding CI agent according to requirements for supporting different RI services. If the network condition and processing performance can satisfy the RI service requirements, the CI agent and the CI server may also be deployed together. Alternatively, the CI may combine the CI server and the CI agent into a same module, which provides all functions of the CI server and the CI agent. The deployment solution may be as follows: A centralized back-end CI server is connected to multiple front-end CI agents. FIG. 2 is a schematic topologic structural diagram of this solution.

Figure 3:
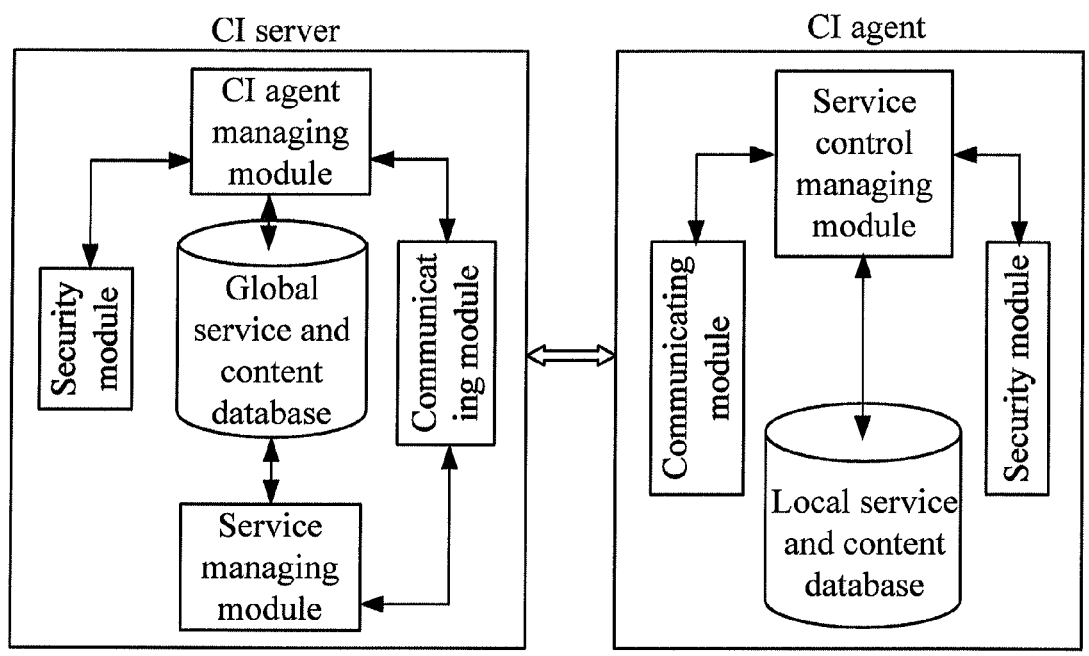
FIG. 3 is a schematic structural diagram of internal functional modules of a license issuing system according to an embodiment of the present application.

The CI server, being a core of the CI, stores all digital content and a corresponding Content Encryption Key (CEK) that are possessed by the CI, and business relations, business policies and rules that are established with the associated RI, and manages all CI agents related information. The CI server and the CI agent may protect data communication between the CI server and the CI agent through a private network or a virtual private network (VPN). Optionally, the CI server and the CI agent may protect the data by constructing a protection message. As an agent deployed on an agent framework of a specific RI, the CI agent may store content related to the associated RI service and the corresponding CEKs and RI related service policies and rules. FIG. 3 is a schematic structural diagram of functional modules of the CI server and the CI agent.

The following a series of interactions may exist between the CI server and the CI agent:

1. Registration and enabling: The CI agent needs to register with the CI server. After mutual authentication succeeds, the CI agent and the CI server exchange necessary information and establish a secure authenticated channel (SAC) for subsequent communication. The CI server may also specify that the CI agent can be normally enabled after the CI agent is activated. The CI agent sends an enabling request to the CI server, and the CI server activates the CI agent by sending an enabling response.

The CI agent can be enabled after the CI agent registers with the CI server and is activated, which facilitates the management on the CI agent. The CI server can even lock the CI agent subsequently to pause or stop the operation of the CI agent.

2. Obtaining the content CEK: Because the CI agent may store the CEKs of part of content, the CI server needs to trigger the CI agent timely to update the CEKs after the CI server adds new digital content, or the CI agent is set to periodically request the CI server for information about whether to update the CEKs when new content is added. This period may be determined through the configurations of the CI agent or by using an update policy.

The CI server may select an incremental update or complete update mode. The incremental update mode is preferred. The CI server binds a content identifier (CID) that is updated since the last update and a CEK of the CID to the CI agent, encapsulates the CID and the CEK into a response message, and returns the response to the CI agent. If no update is made, the CI server does not need to carry any CID or CEK in the response message. After receiving the response message, the CI agent processes the response message, and if a CEK of new content is added, updates the CEK of new content to a local service and content database that are of the CI agent.

3. Obtaining license issuing control information: Through a service controlling module and license issuing control information, the CI agent controls the RI in issuing a license, where the license issuing control information is provided by the CI server to the CI agent. The license issuing control information may be based on license issuing policies and rules that are formulated by the RI related business relations or contracts, or uses an IRO mode. However, if the CI agent controls, based on the IRO, the RI in issuing a license, the CI agent acts as a DRM client of an IRO mechanism, and the CI server issues an IRO to the CI agent. The CI agent consumes corresponding rights of the IRO each time when the CI agent generates a license for the RI.

When the license issuing control information of the CI server changes, the CI server needs to actively trigger the CI agent to obtain the license issuing control information; or the CI agent periodically submits a license issuing control information request message to the CI server. This period may be determined through configurations of the CI agent or by using the policies, or the CI agent requests the CI server for a new IRO immediately after the IRO is consumed completely. The CI server returns corresponding license issuing control information according to the request.

4. Reporting, by the CI agent, license issuing statistics information to the CI server: For the convenience of knowing content sales circumstances of an RI, the CI may make the CI server to trigger the CI agent to report the license issuing statistics information, or the CI agent reports the license issuing statistics information to the CI server periodically. This period may be determined through configurations of the CI agent or by using report policies. The CI agent may report accumulated data or classification statistics data. The data may be uploaded in a total mode or in an incremental mode. Similarly, through configurations or policies, the CI server may specify whether the CI agent needs to delete the reported data after the CI agent reports the statistics data successfully. If the CI agent uses the IRO solution, the CI agent may not report the statistics information, and the CI server collects statistics about such information based on the IRO.

5. Security check, configuration change or upgrade of functional modules: To ensure security and correctness of the CI agent deployed at the RI, the CI server may perform a security check such as annual check on the CI agent. This may be implemented through various modes such as remote login or remote desktop, remote attestation, and function validity check. In addition, the CI server may trigger the CI agent to perform the corresponding process when the configurations of the CI agent need to be changed or functional modules of the CI agent need to be upgraded.

In the system architecture diagram shown in FIG. 1, the connection between the CI server and the CI agent is represented by dotted lines, indicating that the network connection between the CI server and the CI agent may not be kept all the time and that even no connection mechanism is needed. In this case, the CI server and the CI agent may perform necessary operations in an out-of-band mode, such as activation/enabling, security check, change of the configurations of the CI agent, and data transfer. For example, the CI server provides the CI agent with newly-added content information, such as the CID and CEK, and license issuing control information such as license issuing policies and rules or update of the IRO, by using a Compact Disk-Read Only Memory (CD-ROM) or a mobile device, or the CI server collects and obtains the license issuing statistics information from the CI agent.

Figure 4:
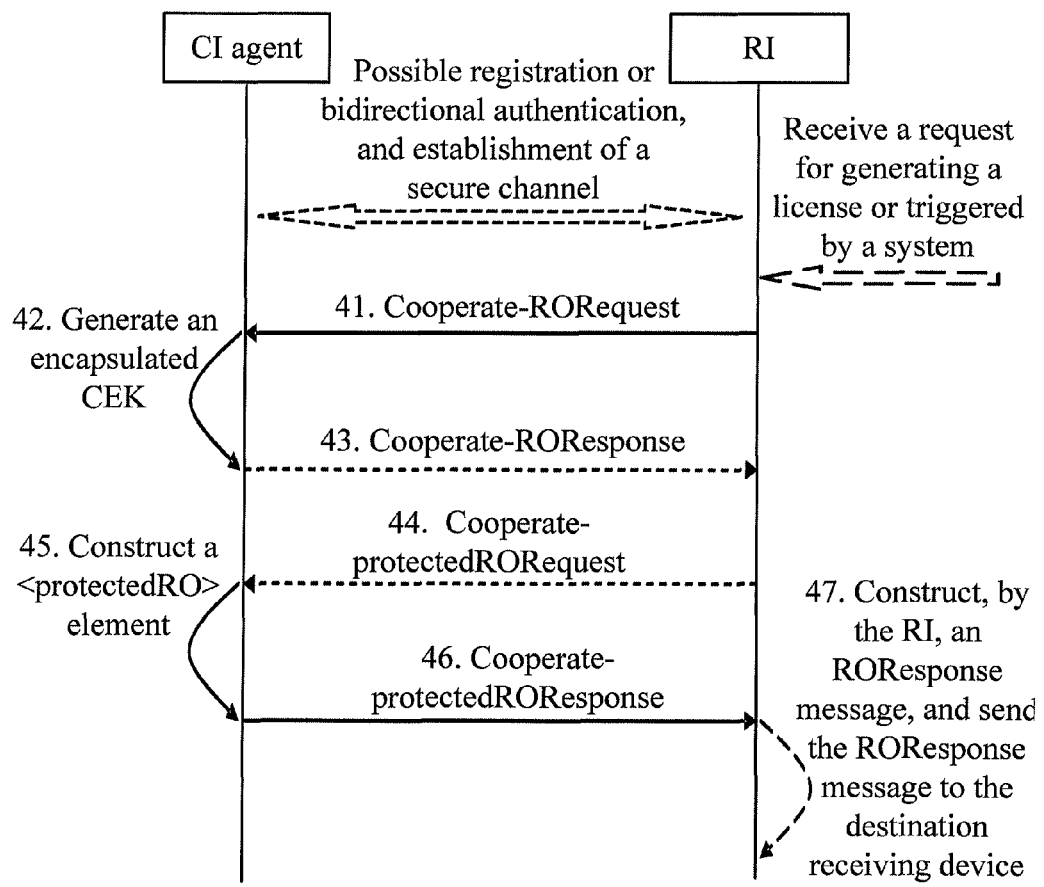
FIG. 4 is a schematic flowchart of a license issuing method according to an embodiment of the present application.

The CI agent needs to establish an immediate and reliable connection with the RI server. The CI agent acts as the server that responds to the RI request, and controls and cooperates with the RI in issuing a license. FIG. 4 is a schematic flowchart of the protocol and process of interactions between the CI agent and the RI server. The following briefs the operational steps of this process:

Initialization step: Before a CI agent performs a formal service connection with an RI, the CI agent may need to complete registration or bidirectional identity authentication first, and then establishes a secure channel (certainly, the CI agent may also establish a secure channel by pre-setting a shared key and algorithm or through the Secure Socket Layer (SSL)) to guarantee subsequent communication sessions.

Process trigger event: The following process may be triggered when the RI receives from a user a request for generating a license for a device. or a system triggers the RI to periodically generate a license for a device of a subscriber within a period of time. The following process may also be triggered due to other reasons.

Step 41: The RI sends a Cooperate-RORequest message to the CI agent, where the Cooperate-RORequest message includes the following parameters:

TABLE 1

Parameters of the Cooperate-RORequest message

| Fields | Status | Description |
|---|---|---|
| Device ID/Device Certificate Chain | M | Destination device ID or device certificate chain to which a license needs to be bound |
| CRL/OCS Response | O | Documents used to verify the validity of the device certificate chain |
| Rights/CID and Rights | M | Rights information in the license, excluding the <EncryptedCEK> element |
| RO Attributes | M | License related attribute information |
| RI Signature Flag | M | Indicates whether an RI needs to sign on the license |
| Selected Algorithms | M | Supported algorithms negotiated between the RI and the destination device |
| RI Signature/MAC | O | Signature or MAC value required for protecting the integrity of the message |

In the preceding Status column in Table 1, the value "M" refers to Mandatory, indicating that the field needs to be included; the value "O" refers to Optional, indicating that the field may be included. Explanations of subsequent tables are the same.

Constructing a request by the RI includes: The RI encapsulates a CID of the corresponding request and requested rights into a <Rights> element without the <EncryptedCEK> element (optionally, the RI does not encapsulate the CID and requested rights into the <Rights> element but only provides information such as the CID and rights). In addition, the RI encapsulates a device certificate chain, (a Online Certificate Status Protocol (OCSP) response used to verify the validity of the device certificate chain, or a Certificate Revocation List (CRL), or the device ID may also be attached), and supported algorithm information negotiated with the requesting device, and RoID attributes allocated to the license, and indication information indicating whether the RI needs to sign on the license, RI signature on the request message or MAC value. If no secure channel is used between the RI and the CI agent, a signature needs to be added; if a SAC is used, a MAC value may be added; if another secure channel is used, it is optional. The RI sends the constructed request message to the CI agent.

To ensure the integrity of the whole protocol process, a corresponding session ID or a Nonce parameter may be added to messages in all steps of the protocol to guarantee the freshness of the messages and protect the messages from anti-replay attacks.

Figure 5:
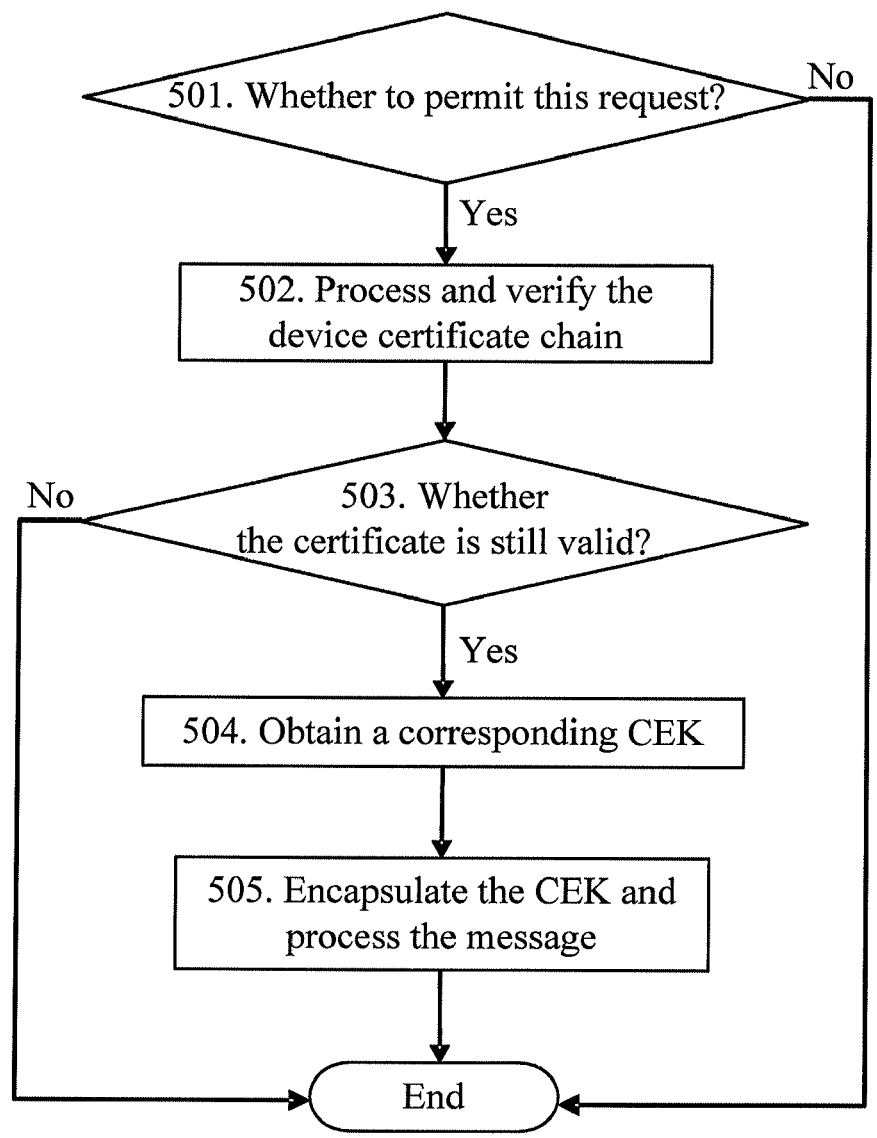
FIG. 5 is a schematic flowchart of a corresponding process performed by a CI agent shown in FIG. 4.

Step 42: The CI agent performs corresponding processing, as shown in FIG. 5.

Step 501: The CI agent first judges, based on the license issuing control information owned by the CI agent, whether to permit response to this request. If the CI agent permits response to this request, the process continues; if the CI agent does not permit response to this request, this request is rejected.

Step 502: The CI agent continues to verify whether the device certificate is still valid according to the device certificate chain (if merely the device ID is available, the device certificate chain needs to be obtained) and corresponding certificate verification materials. The CI agent may also need to obtain verification materials used to verify the validity of the device certificate such as an OCSP response or a CRL from the OCSP responder or the CRL directory server.

Step 503: Processing is performed according to a result of verifying the device certificate. If a device certificate status is still valid, the process continues; if the device certificate status is invalid, this request is rejected.

Step 504: The CI agent searches for and obtains an associated CEK according to the CID. Multiple CIDs may be available, and the CEK may also need to be decrypted.

Step 505: The CI agent generates a $K_{REK}$ at random, encapsulates the CEK by using the $K_{REK}$ and the key encapsulation algorithm among the supported algorithms obtained in step 501 to obtain one or multiple <EncryptedCEK> elements, and fills the <EncryptedCEK> elements in the <Rights> element.

Steps 43 to 44: As shown in FIG. 4, whether these two steps need to be executed depends on a value of the indication information indicating whether the RI needs to put a signature on the license in step 41. If the value of the indication information indicates that the signature is required, steps 43 to 44 need to be executed; if the value of the indication information indicates that the signature is not required, the process skips to step 45 directly. The CI agent encapsulates the <Rights> element (or after standardizing the <Rights> element according to the XML specifications, the CI agent calculates a hash value of the <Rights> element according to a hash algorithm used by the signature algorithm among the supported algorithms obtained in step 41; in this case, only the hash value of the <Rights> element needs to be included) into a Cooperate-ROResponse message, and sends the Cooperate-ROResponse message to the RI. The RI generates a digital signature according to the received <Rights> element (or the hash value of the <Rights> element), encapsulates the digital signature into the Cooperate-protectedRORequest message, and returns the Cooperate-protectedRORequest message to the CI agent.

Step 45: The CI agent generates a $K_{MAC}$ at random according to a key transmission algorithm among the supported algorithms obtained in step 41, connects the $K_{MAC}$ to the $K_{REK}$ in step 42 to obtain a $K_{REK}|K_{MAC}$, and perform algorithm encapsulation on the $K_{REK}|K_{MAC}$. For example, the CI agent may apply the process of the default key transmission algorithm RSAES-KEM-KWS of the DRM standard formulated by the OMA.

The CI agent generates a Z at random, and extracts a public key from the destination device certificate to encrypt the Z to obtain a cipher text C1; the CI agent performs a Key Derivation Function (KDF) operation on the Z to obtain a KEK; the CI agent encapsulates the $K_{REK}|K_{MAC}$ by using the KEK to obtain a cipher text C2; the CI agent connects the C1 and C2, and encodes the C1 and C2 to obtain an <encKey> element. If a <timestamp> element is required, the RI may include this element in step 41, or the CI agent may generates and adds this element after implementing time synchronization with the RI. The CI agent obtains a <ro> element, whose type is ROPayload, through assembly, and processes the <ro> element by using the MAC algorithm among the supported algorithms obtained in step 41 to generate a corresponding <mac> element. Finally, the CI agent possesses all the information required for assembling a complete <ProtectedRO>, and may assemble the information into a <ProtectedRO> element.

Step 46: The CI agent encapsulates the <ProtectedRO> element into a response message, and sends the response message to the RI. If the RI receives the hash value of the <Rights> element in step 43, the RI may also optionally verify, when receiving the license, whether the hash value of the <Rights> element in the license is the same as the hash value received in step 43. The CI agent may store the license so as to report statistics to the CI server subsequently.

Step 47: This step is optional, and the specific implementation solution depends on actual conditions of the RI. The RI constructs an ROResponse message that includes a <ProtectedRO> element as a necessary component, and sends the ROResponse message to a terminal device.

After receiving the <ProtectedRO> element, the RI may construct an ROResponse message, generates and adds a digital signature, and sends the ROResponse message to the destination device. The following shows a relational tree structure of elements in the ROResponse message:

```
<roResponse>
    ......
    <protectedRO>
        <ro |{ro attributes}> of ROPayload// step 41
        ......
        <rights>
            ......
            <asset> // multiple content assets may be available
                < context><uid>ContentID</uid></context>
                ......
                <KeyInfo>
                    ......
                    <CipherData>EncryptedCEK</CipherData>
                </KeyInfo> // step 42
            </asset>
            ......
```

```
            </rights>
            <signature>......</signature> // RI digital signature on the <rights>
element (optional) ——step 44
            <timeStamp>......</timeStamp> // step 41 or 45 (optional)
            <encKey>detailed encKey value</encKey>// step 45
        </ro>
        <mac> detailed mac value over ro</mac> // step 45
    </protectedRO> // step 46
    ......
        <signature>......</signature> // RI digital signature on the ROResponse
message // step 47
    </roResponse>// step 47
```

Figure 6:
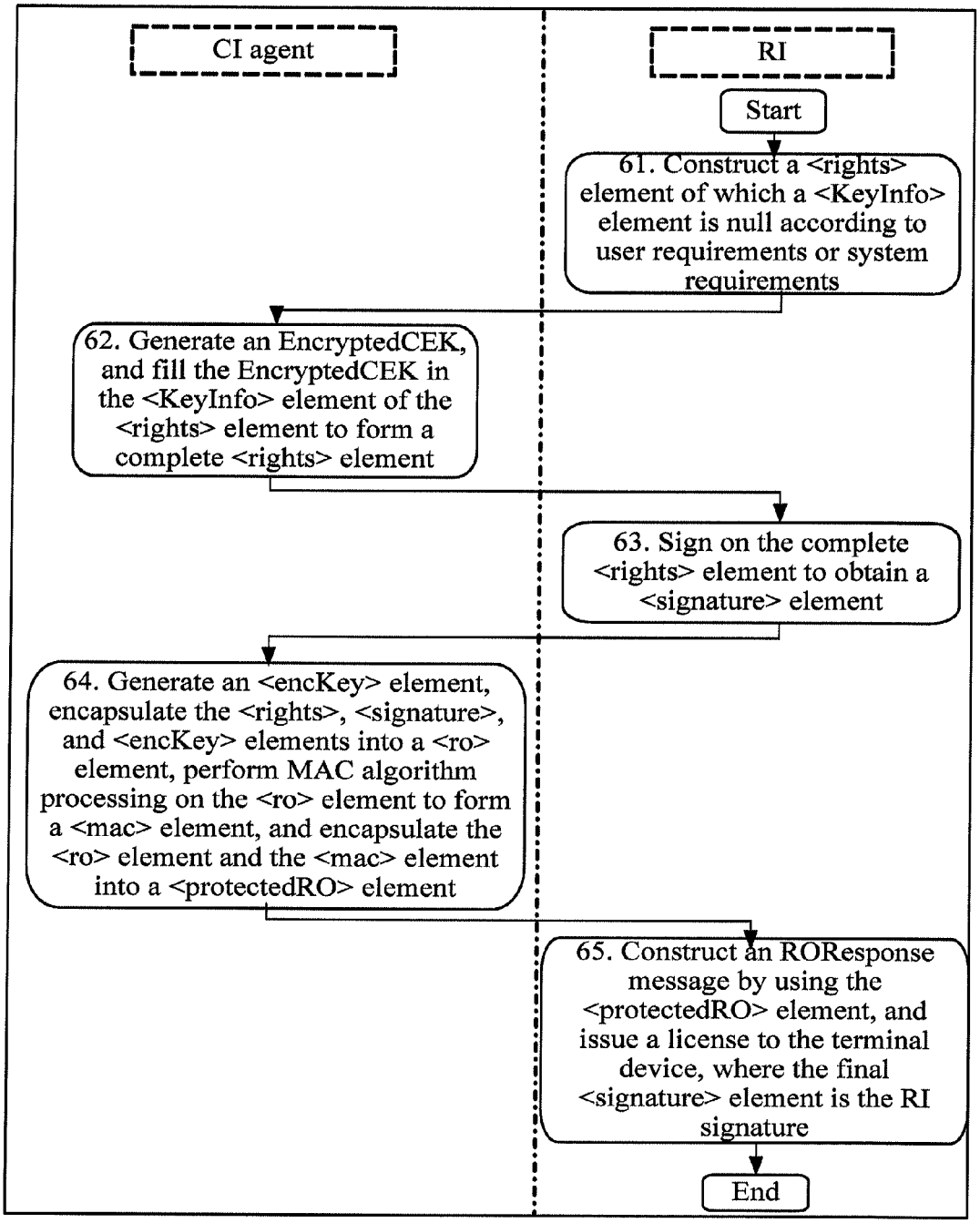
FIG. 6 is another schematic flowchart of a license issuing method according to an embodiment of the present application.

Accordingly, FIG. 6 is a flowchart about controlling and participating in, by a CI agent, a process of issuing a license by an RI according to an embodiment of the present application. The process includes the following steps:

Step 61: An RI constructs, according to user requirements or system requirements, a <rights> element of which a <KeyInfo> is null.

Step 62: A CI agent generates an EncryptedCEK, and fills the EncryptedCEK in the <KeyInfo> element of the <rights> element to form a complete <rights> element.

Step 63: The RI signs on the complete <rights> element to obtain a <signature> element.

Step 64: The CI agent generates an <encKey> element bound to a destination device, encapsulates the <rights>, <signature>, and <encKey> elements into a <ro> element, performs MAC algorithm processing on the <ro> element to form a <mac> element, and encapsulates the <ro> element and the <mac> element into a <protectedRO> element.

Step 65: The RI constructs an ROResponse message by using the <protectedRO> element, and issues a license to a terminal device. The final <signature> element is the RI signature.

As shown in FIG. 6, because the RI does not control a CEK of the content, the RI needs to request the CI agent for an encapsulated CEK cipher text EncryptedCEK, but the RI cannot decrypt the EncryptedCEK. The CI agent encapsulates a $K_{REK}$ used for encrypting the CEK and a $K_{MAC}$ for guaranteeing the integrity of the license by using a public key of the destination device. Because the RI does not possess a private key of the destination device, the RI cannot obtain the $K_{REK}$ and $K_{MAC}$ through decryption, and thus the confidentiality of the CEK is kept from the RI. In addition, the RI cannot modify the license because the CI agent protects the integrity of the license by using the $K_{MAC}$, which can effectively prevent the RI from modifying rights information in the license and prevent the RI from issuing another license to the device in future by using the obtained EncryptedCEK, and the $K_{REK}$ and $K_{MAC}$ that are already encapsulated to the destination device.

Figure 7:
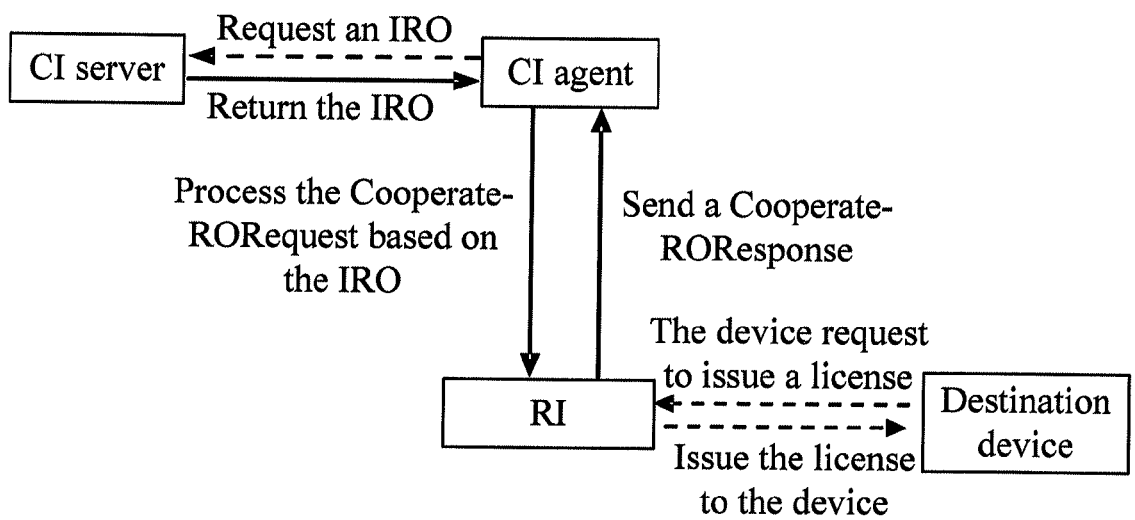
FIG. 7 is a schematic flowchart of a control process by using an Issuer RO (IRO) according to an embodiment of the present application.

The license issuing control information applies an IRO solution. FIG. 7 is a flowchart of a process of controlling the RI in issuing a license according to an embodiment of the present application.

If a CI agent controls the RI in issuing a license by using the IRO, the CI agent needs to update status information of the IRO timely after controlling the RI in issuing the license successfully.

Figure 8:
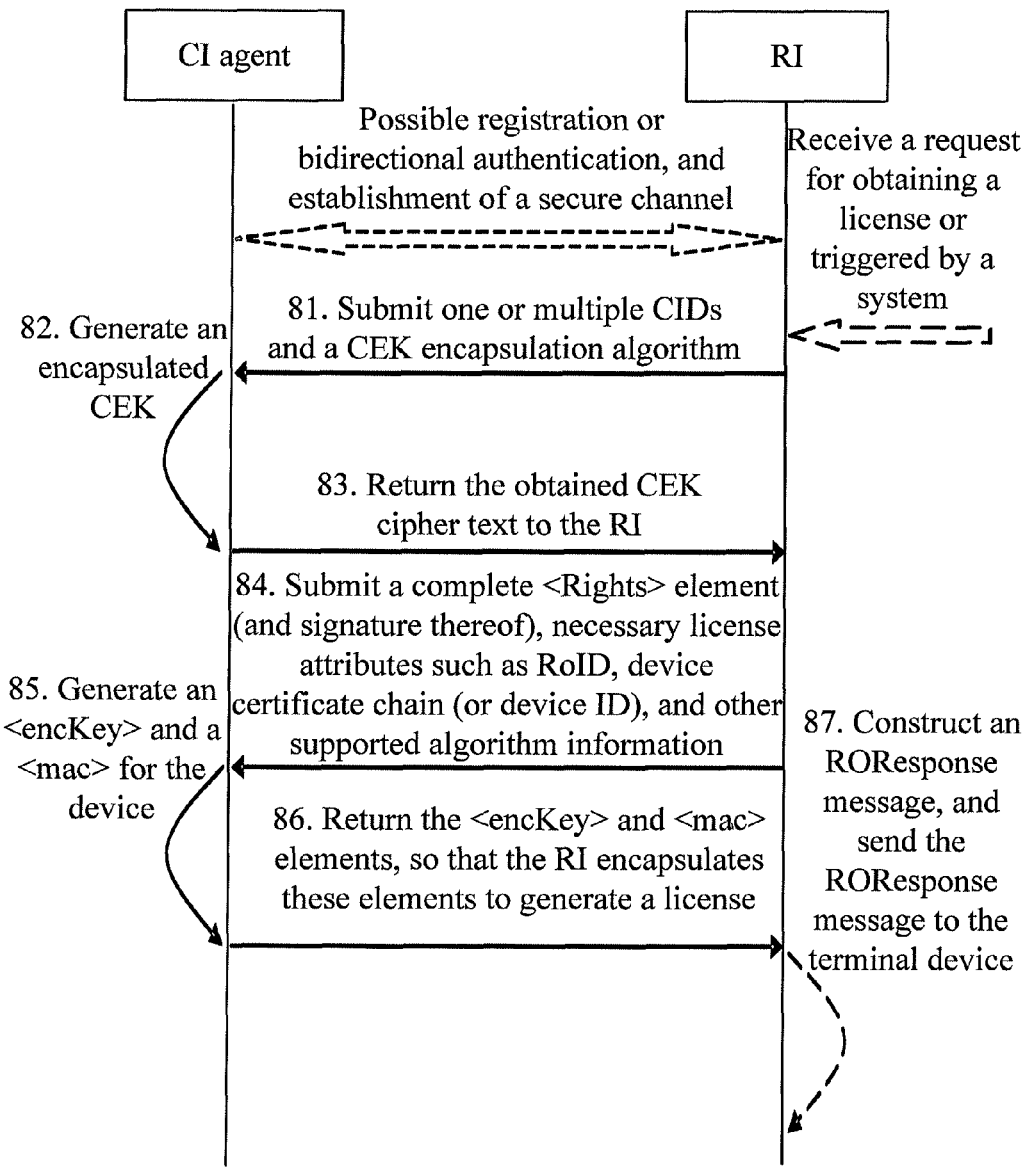
FIG. 8 is another schematic flowchart of a license issuing method according to an embodiment of the present application.

Optionally, modifications may be made to the process of interactions between the CI agent and the RI. FIG. 8 is a schematic flowchart of the modified process, which includes the following steps:

An initialization step and step 87 are the same as those in the technical solution shown in FIG. 4.

Step 81: An RI receives from the user a request for generating a license for a device of the RI, encapsulates a corresponding CID of one or multiple requests and a key encapsulation algorithm among supported algorithms negotiated with a destination device into a request message, and sends the request message to a CI agent.

Step 82: The CI agent searches for an associated CEK according to the CID, generates a $K_{REK}$ at random and encapsulates the GEK by using the $K_{REK}$ and the key encapsulation algorithm that is obtained in step 81 to obtain an <EncryptedCEK> element.

Step 83: The CI agent returns a CEK cipher text obtained through encapsulation, that is, the <EncryptedCEK> element, to the RI.

Step 84: The RI fills the <EncryptedCEK> element in a <Rights> element, and submits the following information included in the request for generating the license to the CI agent: a complete <Rights> element (if a signature on the <Rights> element needs to be included, the RI may generate and attach a <signature> element), necessary license attributes, a device certificate chain (an OCSP response used to verify the validity of the device certificate chain or a CRL or only a device ID may be attached), and supported algorithm information negotiated with a destination device such as a key transmission algorithm and a MAC algorithm.

Step 85: The CI agent first judges, based on the license issuing control information owned by the CI agent, whether to permit response to this request; if the CI agent does not permit response to this request, this request is rejected; if the CI agent permit response to this request, the process continues. Then, the CI agent continues to verify whether a device certificate is still valid according to the certificate chain of the destination device (if merely the device ID is available, the device certificate chain needs to be obtained) and corresponding certificate verification materials. The CI agent may need to obtain verification materials such as an OCSP response or a CRL from the OSCP responder or the CRL directory server. If the device certificate is invalid, this request is rejected; if the device certificate is valid, the process continues. The CI agent generates a $K_{MAC}$ at random, connects the $K_{MAC}$ with the $K_{REK}$ generated in step 82, and encapsulates, according to the key transmission algorithm among the supported algorithms obtained in step 84, a connection value of the $K_{REK}$ and $K_{MAC}$ to obtain an <encKey> element. If a <timestamp> element is required, the RI may include this element in step 84, or the CI agent generates and adds this element after implementing time synchronization with the RI. The CI agent obtains a <ro> element whose type is ROPayload through assembly, and processes the <ro> element by using the MAC algorithm among the supported algorithms obtained in step 84 to generate a corresponding <mac> element. Finally, the CI agent possesses all the information required for assembling a complete <ProtectedRO> element.

Step 86: To reduce communication data amount, the CI agent may choose to send the <encKey> element and the <mac> element that are generated for the destination device to the RI. The RI is responsible for assembling the <ProtectedRO> element. Certainly, the CI agent may also choose to assemble these elements into a complete <ProtectedRO>, and then send the <ProtectedRO> to the RI; the RI generates an ROResponse, and sends the ROResponse to the destination device. The CI agent may store the license so as to report statistic data to the CI server subsequently.

To ensure the integrity of the whole protocol process, a corresponding session ID or a Nonce parameter may be added to messages in all the preceding steps to guarantee the freshness of the messages and protect the messages from anti-replay attacks.

Figure 9:
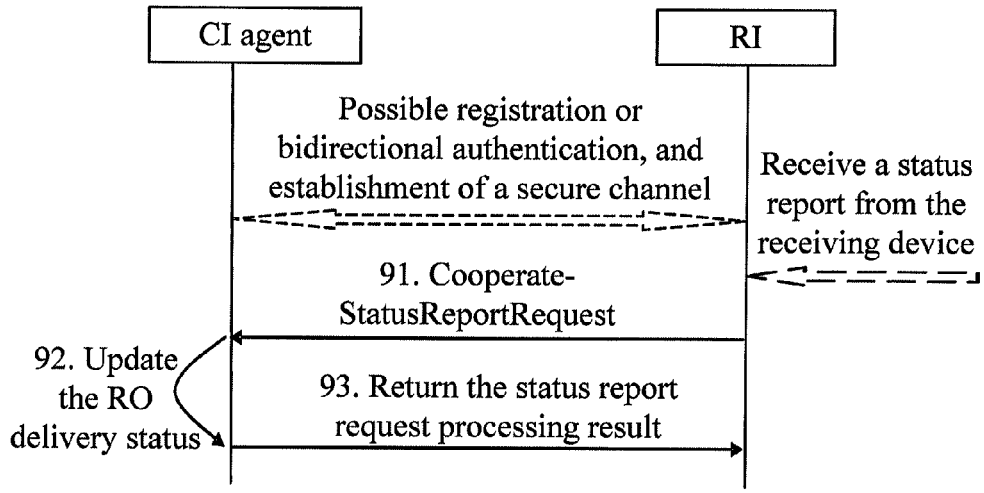
FIG. 9 is a schematic flowchart of a method for collecting statistics about a license issuing status according to an embodiment of the present application.

Optionally, status report mechanisms of the CI and the RI may be added to further ensure accuracy of statistics about the RO delivery results collected by the CI and protect interests of the RI, thus preventing the CI from collecting statistics about a failed RO as a successful RO when the DRM agent fails to obtain the RO. As shown in FIG. 9, the solution includes the following steps:

Initialization step: Before a CI agent performs a formal service connection with an RI, the CI agent may need to complete registration or bidirectional identity authentication first, and then establishes a secure channel (certainly, the CI agent may establish a secure channel by pre-setting a shared key and algorithm or through an SSL) to guarantee subsequent communication sessions.

Process trigger event: After receiving an RO delivery result status report from a destination receiving device, the RI processes the status report, and copies the status report to the CI agent.

Step 91: The RI sends a Cooperate-StatusReportRequest message to the CI agent, where the Cooperate-StatusReportRequest message includes the following parameters:

TABLE 2

Parameters of the Cooperate-RORequest message

| Fields | Status | Description |
| --- | --- | --- |
| Device ID/Device Certificate Chain | M | Destination device ID or device certificate chain bound to a license |
| CRL/OCSP Response | O | Materials used to verify validity of a device certificate chain |
| StatusReport | M | Status report bearing a signature of the destination receiving device |

Constructing a request by the RI includes: using a corresponding device certificate chain (an OCSP response used to verify the validity of the device certificate chain or a CRL or only a device ID may also be attached), supported algorithm information negotiated with the destination receiving device, and status report bearing the signature of the receiving device. The RI sends the constructed request to the CI agent.

To ensure the integrity of the whole protocol process, a corresponding session ID or a Nonce parameter may be added to messages in all steps of the protocol to guarantee the freshness of the messages and protect the messages from anti-replay attacks.

Figure 10:
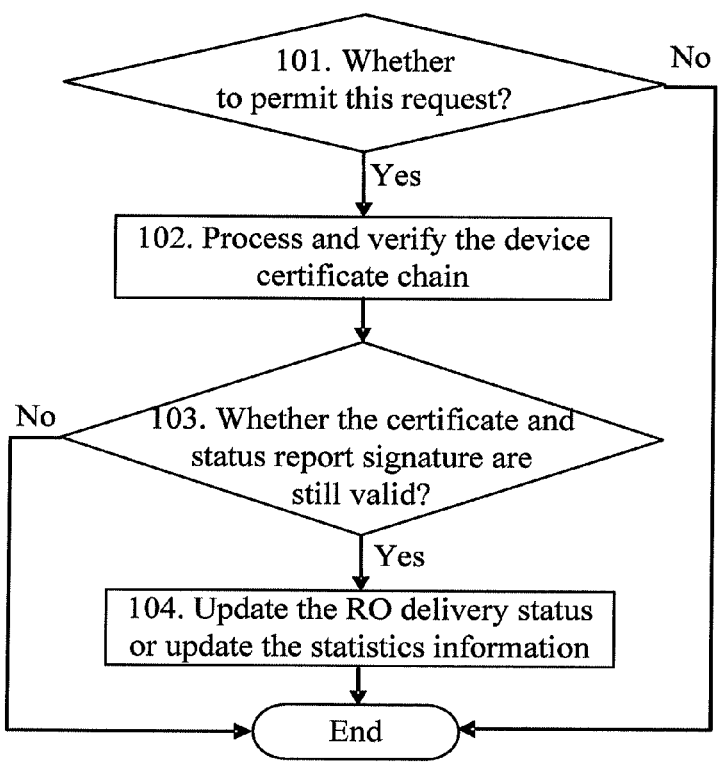
FIG. 10 is a schematic flowchart of a corresponding process performed by a CI agent shown in FIG. 9.

Step 92: As shown in FIG. 10, the CI agent performs corresponding processing, including the following steps:

Step 101: The CI agent first judges, based on license issuing control information and/or license issuing history information that are owned by the CI agent, whether to permit response to this request. If the CI agent permits response to this request, the process continues; if the CI agent does not permit response to this request, this request is rejected.

Step 102: The CI agent continues to verify whether a device certificate is still valid according to the device certificate chain (if merely the device ID is available, the device certificate chain needs to be obtained) and corresponding certificate verification materials. The CI agent may also need to obtain verification materials used to verify the validity of the device certificate such as an OCSP response or a CRL from the OCSP responder or the CRL directory server.

Step 103: Processing is performed according to a result of verifying the device certificate. If a device certificate status is still valid, the process continues; if the device certificate status is invalid, this request is rejected.

Step 104: The CI agent updates the RO delivery record status or the statistics information according to the status report result.

Step 93: As shown in FIG. 9, the CI agent returns a status report processing result to the RI.

During the implementation of the solution, the delivery status of all ROs on the CI agent may be "Successful" by default, and the RI may send failed reports (including various failure reasons) to the CI agent. If the CI agent does not receive a corresponding status report within a certain interval, the RO is delivered successfully by default. In this way, the quantity of status report messages between the CI agent and the RI may be reduced, and the overall system performance is improved.

In another embodiment, a CI may also control an RI in issuing a license in a Marlin framework.

Figure 11:
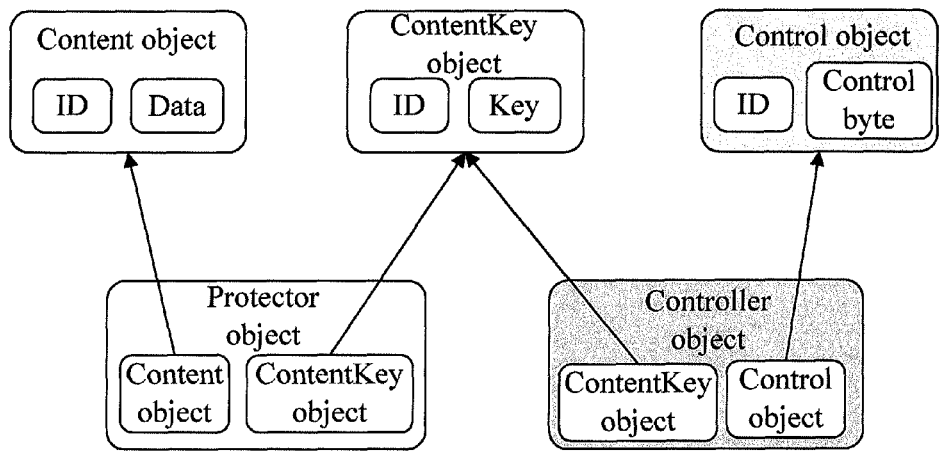
FIG. 11 is a structural diagram of components of a content and license in a Marlin system according to an embodiment of the present application.

FIG. 11 is a structural diagram of components of a content and license in a Marlin system.

A Content object includes a content ID and content data. The content data is encrypted by using a symmetric key ContentKey.

A license object is used to protect the content and associate use rules (control) with the protected content. Specifically, the license object includes:

A ContentKey object includes a key and a key ID for encrypting content corresponding to the license, where the content key is encrypted with a node to which the content is bound. The node may be a user account, a domain, or a device, and the key may be a public key or a symmetric key.

A Protector object is used to represent a binding relationship between the content and the key of the protected content.

A Control object specifies the rules for managing how to use the content key to decrypt the content.

A Controller object is used to represent a binding relationship between the ContentKey and the Control that manages the use of the ContentKey. A terminal uses a content decryption key in the ContentKey object under the management of the rule in the Control object so as to use the content associated with the Protector object. The Controller object needs to be signed to establish a valid binding relationship between the ContentKey and the Control object that manages the use of the ContentKey, and between the ContentKey ID and the actual key data. The signature on the Controller object may be a public key signature or a symmetric key signature or a combination of the public key signature and symmetric key signature.

Figure 12:
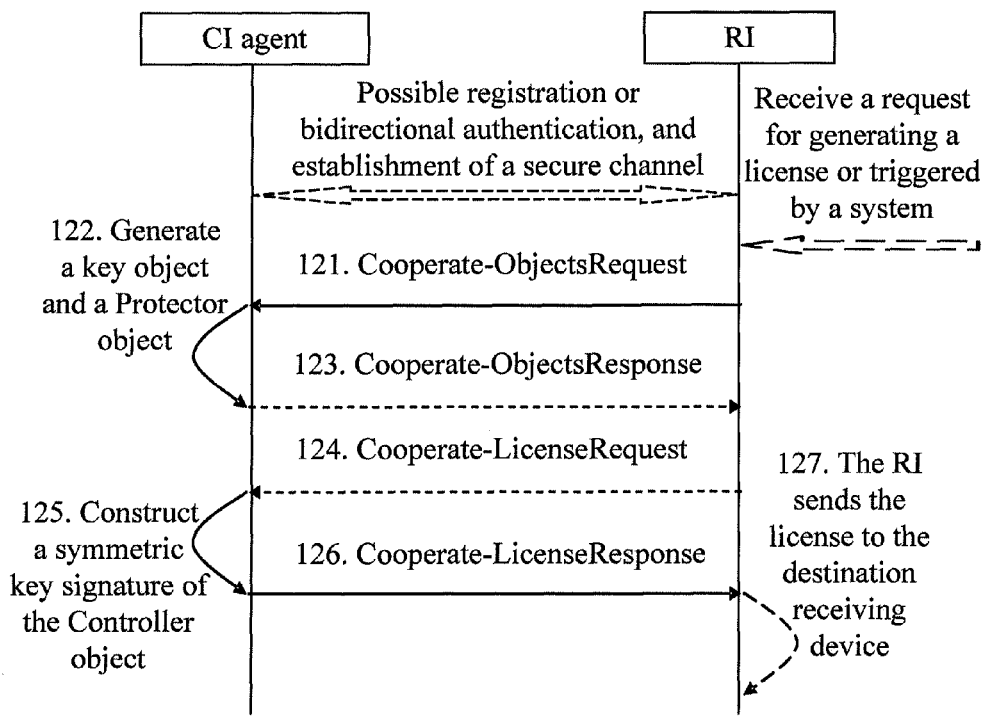
FIG. 12 is another schematic flowchart of a license issuing method according to an embodiment of the present application.

In this solution, a CI agent also acts as a server to respond to an RI request and to control and cooperate with the RI in issuing a license. FIG. 12 is a schematic flowchart of the protocol and process of interactions between the CI agent and the RI. The following briefs the process of this solution.

Initialization step: Before a CI agent performs a formal service connection with an RI, the CI agent may need to complete registration or bidirectional identity authentication, and then establishes a secure channel (certainly, the CI agent may establish a secure channel by pre-setting a shared key and algorithm or through an SSL) to guarantee subsequent communication sessions.

Process trigger event: The following process may be triggered when the RI receives from a user a request for generating a license for a device or user account, or a system triggers the RI to periodically generate a license for a device of a subscriber within a period of time. The following process may also be triggered due to other reasons.

Step 121: The RI sends a Cooperate-ObjectsRequest message to the CI agent. The Cooperate-ObjectsRequest message should include at least the following parameters: an object indicating a user account node or device node (and a possible link object connecting the user with the device) and a requested content ID. Optionally, the RI may also construct a request by using a device certificate, supported algorithm information negotiated with the requesting device, indication information indicating whether the RI needs to sign on the license, and a signature on the request message or a MAC value of the request message (if no secure channel is used between the RI and the CI agent, a signature needs to be added; if an SAC is used between the RI and the CI agent, the MAC value may be added; if another secure channel are used, it is optional). The RI sends the constructed request message to the CI agent. If the RI does not need to sign on the license or the CI needs to add an Agent control terminal to the Control object, the constructed request message also needs to include the Control object that specifies the content use rights (if the CI does not need to strictly control information in the license generated by the RI, but needs to pay attention to a certain license that the RI generates for a user or a device, and the CI does not need to add the Agent to the Control object, an ID and a hash value of the Control object need to be sent); otherwise, the RI may choose that the Control object is included in the constructed request message or the Control object is included in a Cooperate-LicenseRequest message in the following step 124.

Step 122: The CI agent verifies the validity of the device certificate and the validity of the association between the node objects (and possible link object). After the validity verification succeeds, the CI agent generates, according to the content ID, a corresponding ContentKey object and a Protector object that are bound to the device node or the user account node.

Steps 123 to 124: Whether these two steps need to be executed depends on a value of the indication information indicating whether the RI needs to put a signature on the license in step 121. If the value of the indication information indicates that the signature is required, steps 123 to 124 need to be executed; if the value of the indication information indicates that the signature is not required, the process skips to step 125 directly. Step 123: The CI agent encapsulates the generated objects in a Cooperate-ObjectsResponse message, and sends the Cooperate-ObjectsResponse message to the RI. Step 124: The RI generates a Controller object according to the received object information, signs on the Controller object by using its own private key, encapsulates the Controller object in the Cooperate-LicenseRequest message, and returns the Cooperate-LicenseRequest message to the CI agent.

Step 125: If steps 123 to 124 are executed, the CI agent generates, according to the supported algorithm information obtained in step 121, a corresponding symmetric key signature for the Controller object (including the private key signature of the RI) by using the CEK of the content object, and embeds the symmetric key signature into the Controller object (or directly provides a corresponding symmetric key signature); if steps 123 to 124 are not executed, the CI agent generates a Controller object, and generates, according to the supported algorithm information obtained in step 121, a corresponding symmetric key signature for the Controller object by using the ContentKey of the content object.

Step 126: The CI agent encapsulates the generated objects into a response message, and sends the response message to the RI. The CI agent may store the license so as to report statistics to the CI server subsequently.

Step 127: This step is optional, and the specific implementation solution depends on actual conditions of the RI. The RI sends all the license related information to the destination terminal device.

In the preceding protocol and process of interactions, because the public key signature of the Controller object is optional, if the RI does not need to generate a public key signature for the Controller object, the interactions between the RI and the CI agent may be simplified as a pair of messages. In addition, to simplify the service mode, the RI may choose not to send the rights information of the license (that is, the Control object) to the CI agent, but sends only a rights ID and hash value of the license to the CI agent.

By using the technical solutions provided in the embodiments of the present application, the CI or the CP that are of the digital content may flexibly deploy its functional modules according to its actual service requirement to meet various requirements such as security, scalability, and controllability and manageability. In addition, the CI agent may effectively control the RI in issuing a license, without any modifications to the terminal device, and the research and development and operations on the device may still be based on the existing OMA DRM or the Marlin standard.

Relatively speaking, the preceding technical solutions are applicable to large-scale CIs or CPs with a lot of contents. However, small-scale CIs are not willing to pay such huge costs. Therefore, a lightweight solution may also be taken into consideration, in which the CI agent is installed on the RI server in a plug-in mode to achieve the same purpose of controlling the RI in issuing a license.

Figure 13:
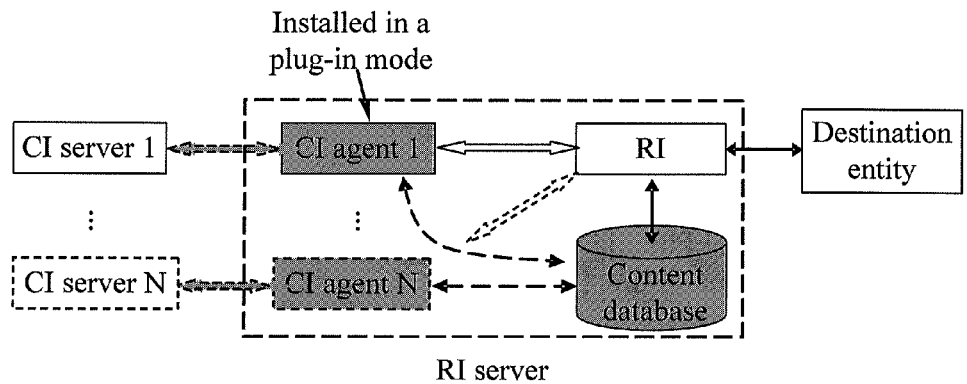
FIG. 13 is another schematic architecture diagram of a license issuing system according to an embodiment of the present application.

This solution may be as follows: The CI implements its CI agent functional modules in the plug-in mode; each time when each functional component of the CI agent is called, the integrity of each functional component of the CI agent needs to be verified to prevent tampering or replacement. In addition, this solution requires a secure and executable environment that may be implemented by using a security hardware device and another device. The CI installs the CI agent plug-in on the RI server in an out-of-band mode. A network connection may be required between the CI agent and the CI server, or no connection mechanism is required, and the data is transmitted between the CI agent and the CI server completely in the out-of-band mode. FIG. 13 is a schematic architecture diagram of a system of this solution.

On the RI server, multiple different CI agent plug-ins of the CI may be installed and work independently without mutual interference. The RI has functions of managing the CI agent plug-ins installed on the RI server, such as installing, maintaining, disabling, and uninstalling the plug-ins. The RI may require the CI to generate corresponding code signatures on the CI agent plug-ins to correctly identify and manage corresponding CI agent plug-ins.

When the CI agent plug-ins are installed on the RI server, these plug-ins needs to be registered with an RI system. The registration information includes parameters shown in the following table:

TABLE 3

Registration information of the CI agent plug-ins on the RI

| Fields | Status | Description |
|---|---|---|
| CI Agent Info. | M | Description information of a CI agent plug-in |
| CI/CP ID | M | CI or CP identity |
| CI/CP Name | O | CI or CP name |
| CI/CP URL | O | URL link for browsing related CI or CP |
| Security Token Zone | O | Zone where the CI agent plug-in uses the security hardware device (and key pair storage location) |
| Service Portal/ Interface | M | Service port or service interface of the CI agent |

The service port of the CI agent may be an allocated address (no matter whether the address is only an internal address, a Network Address Translation (NAT) address or an IP address that can be directly accessed externally) and a port number, or a service interface solution for inter-process communication. Once the CI agent runs, the CI agent intercepts the service port or service interface, receives requests and provides corresponding services. Through such information, the RI can find the service port or service interface of a related CI agent plug-in when the RI requires the digital content issued by a CI, and interact with the CI agent.

The CI agent plug-ins provide corresponding interfaces to obtain content related information such as the CID, CEK bound to the CI agent, and other identifier information of the content from the CI server (or through a network connection with the CI server or through a graphic interface, a USB interface, and an MMC/SD/CF card interface). After receiving the information, the CI agent enables the RI to obtain the content information through the interface with the RI or the content database shared with the RI. The following table lists the parameters included in the content information that the RI needs to obtain.

TABLE 4

Registration information of the CI agent plug-ins on the RI

| Fields | Status | Description |
|---|---|---|
| CID | M | Digital content identifier |
| Content Information | O | Related description infomation of the digital content |
| CEK Cipher | O | CEK cipher text bound to the CI agent |
| CI/CP Internal ID | M | Internal identifier of the CI or CP to which the content belongs |
| CI/CP ID | O | Identifier of the CI or CP to which the content belongs |

Through the information listed in Table 3 and Table 4, when the RI needs to issue the license of particular content, the RI may determine, through the CID, the internal identifier of the CI or the CP to which the content belongs, and then obtain the corresponding CI/CP ID.

The RI can determine a corresponding CI agent plug-in and the service port of the CI agent plug-in according to the CI/CP ID. With respect to the CEK cipher text bound to the CI agent, the RI may obtain the CEK cipher text bound to the CI agent, encapsulate the CEK cipher text into a request, and send the request to the CI agent; or the CI agent obtains the CEK cipher text according to the CID. The CI agent can obtain a CEK plain text with the help of the security hardware device.

To control the RI in issuing a license, the CI agent needs corresponding license issuing control information. Preferably, the IRO solution proposed in the preceding technical solution may be used. That is, the CI server issues an IRO for the CI agent; the CI agent acts as the client of the IRO DRM mechanism to control, based on the IRO, the RI in issuing the license. The CI agent plug-in provides a corresponding interface for obtaining the IRO from the CI server and is responsible for maintaining the IRO status information (or through the network connection with the CI server or through a graphic interface, a USB interface and an MMC/SD/CF card interface). This also needs the help of the security hardware device. After the CI agent controls the RI in issuing the license successfully, the CI agent needs to update the IRO status information.

In addition, to enable the RI to master the remaining rights of the IRO timely and ensure the normal issuing of the license, the CI agent may provide the RI with a function of querying for the remaining rights of the IRO. This function is used to generate an alarm to the RI when the rights allocation reaches a certain threshold. For example, the RI sets a querying condition (for example, the number of issuing rights that are remained is smaller than 100), and sends the querying condition to all the CI agent plug-ins. The CI agent plug-ins query for the status information of their own IROs, compare the remaining rights information with that of the querying condition, and return the comparison result to the RI; or only the CI agent plug-ins that comply with the querying condition need to send alarm information to the RI.

Figure 14:
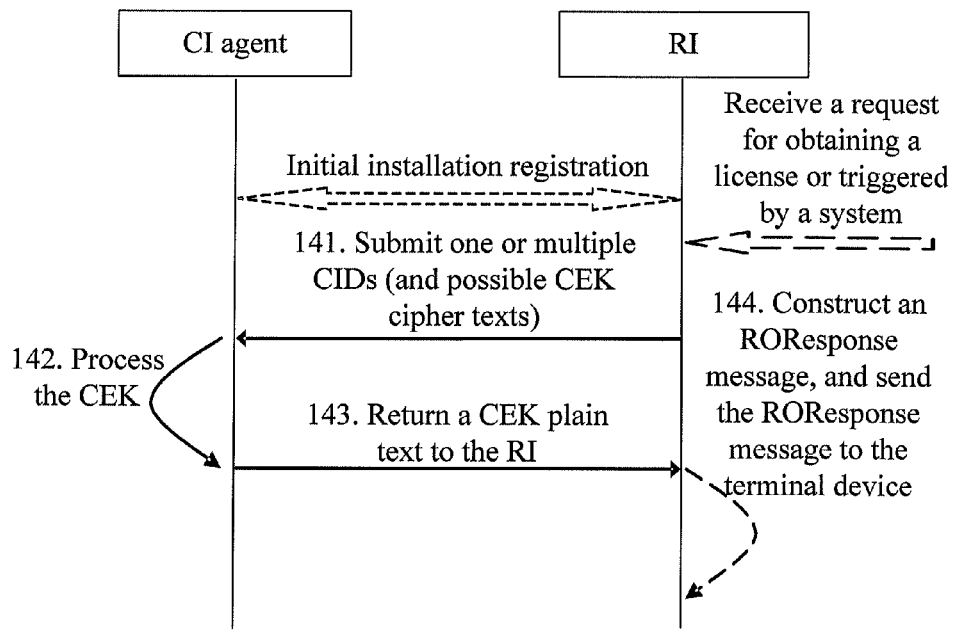
FIG. 14 is a schematic flowchart of a license issuing method in a system shown in FIG. 13.

If the CI agent can effectively monitor the processes of generating a license and issuing the license by the RI, the CI agent may directly return, according to the RI request, the CEK plain text of the requested content to the RI for issuing the license. FIG. 14 is a flowchart of a license issuing method according to an embodiment of the present application. The method includes the following steps:

Step 141: An RI submits one or multiple CIDs and possible CEK cipher texts to a CI agent according to user requirements or system requirements.

Step 142: The CI agent processes the CEKs.

Step 143: The CI agent returns processed CEK plain texts to the RI.

Step 144: The RI constructs an ROResponse and sends a license to a terminal device.

To effectively monitor the processes of generating a license and issuing the license by the RI, the protocol and process of interactions between the CI agent and the RI provided in FIG. 4, FIG. 8, or FIG. 12 may also be used. That is, the CI agent plug-in controls the RI in issuing the license.

Figure 15:
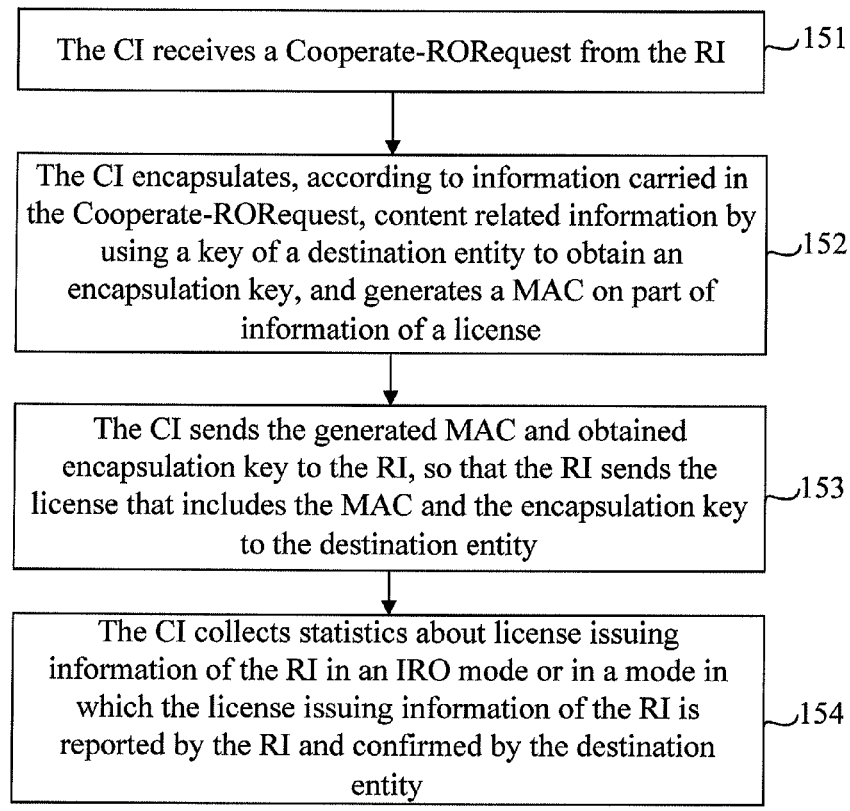
FIG. 15 is a flowchart of a license issuing method according to an embodiment of the present application.

In conclusion, FIG. 15 is a flowchart of a license issuing method according to an embodiment of the present application. The method includes the following steps:

Step 151: A CI receives a Cooperate-RORequest from an RI.

Step 152: The CI encapsulates, according to information carried in the Cooperate-RORequest, content related information by using a key of a destination entity to obtain an encapsulation key, and generates a MAC on part of information of a license.

Step 153: The CI sends the generated MAC and obtained encapsulation key to the RI, so that the RI sends the license that includes the MAC and the encapsulation key to the destination entity.

In an OMA DRM system, step 152 includes:

The CI obtains, according to the information carried in the Cooperate-RORequest, content related information, information of the content use rights of the destination entity, and key information of the destination entity;

the CI finds an associated CEK according to the content related information;

the CI generates a license encryption key and a message authentication key, encapsulates the CEK by using the license encryption key, and encapsulates the license encryption key and the message authentication key by using the key of the destination entity to obtain an encapsulation key;

the CI generates a MAC on part of information of the license by using the message authentication key, where the part of information of the license includes the content related information, information of the content use rights of the destination entity, and obtained encapsulation key.

In the Marlin system, step 152 includes:

The CI obtains, according to the information carried in the Cooperate-RORequest, content related information, information of the content use rights of the destination entity, and key information of the destination entity;

the CI finds an associated CEK according to the content related information;

the CI encapsulates the CEK by using the key of the destination entity to obtain an encapsulation key;

the CI generates a MAC on part of information of the license by using the CEK, where the part of information of the license includes the content related information, information of the content use rights of the destination entity, and obtained encapsulation key.

In an exemplary embodiment, the part of information of the license further includes digital signatures of the RI on the content related information, information of content use rights of the destination entity, and encapsulated CEK. In this case, step 152 further includes:

The CI sends the encapsulated CEK to the RI, receives the digital signatures of the RI, and generates a MAC on part of information of the license that includes the digital signatures.

Optionally, after the RI sends the license to the destination entity, the method further includes:

Step 154: The CI collects statistics about the license issuing information of the RI in an IRO mode or in a mode in which the license issuing information of the RI is reported by the RI and confirmed by the destination entity.

Based on the preceding license issuing method, embodiments of the present application respectively provide a content issuing device, a license issuing device, and a license issuing system.

Figure 16:
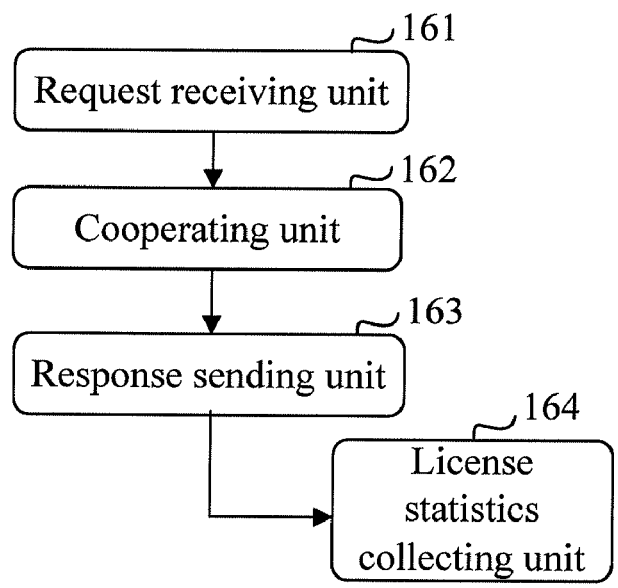
FIG. 16 is a schematic structural diagram of a content issuing device according to an embodiment of the present application.

As shown in FIG. 16, an embodiment of the present application provides the content issuing device, including:

a request receiving unit 161, configured to receive a Cooperate-RORequest from an RI;

a cooperating unit 162, configured to encapsulate, according to information carried in the Cooperate-RORequest, content related information by using a key of a destination entity to obtain an encapsulation key, and generate a MAC on part of information of a license; and a response sending unit 163, configured to send the MAC generated by the cooperating unit 162 and encapsulation key obtained by the cooperating unit 162 to the RI, so that the RI sends the license that includes the MAC and the encapsulation key to the destination entity.

Figure 17:
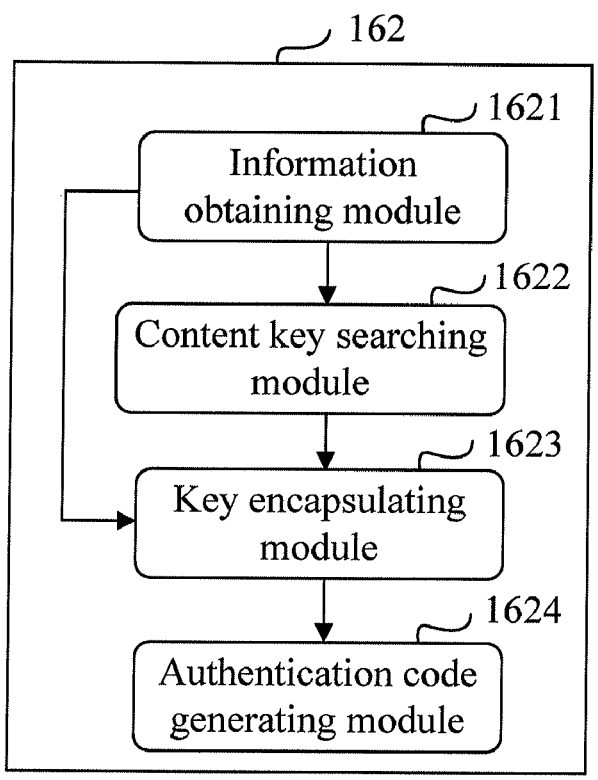
FIG. 17 is a schematic structural diagram of a cooperating unit shown in FIG. 16.

As shown in FIG. 17, the cooperating unit 162 includes an information obtaining module 1621, a content key searching module 1622, a key encapsulating module 1623, and a MAC generating module 1623.

The following describes the functions of each module of the cooperating unit 162 in an OMA DRM system.

The information obtaining module 1621 is configured to obtain content related information, information of the content use rights of the destination entity, and key information of the destination entity from the request receiving unit.

The content key searching module 1622 is configured to find an associated CEK according to the obtained content related information.

The key encapsulating module 1623 is configured to: generate a license encryption key and a message authentication key, encapsulate the CEK by using the license encryption key, and encapsulate the license encryption key and message authentication key by using the key of the destination entity to obtain an encapsulation key.

The authentication code generating module 1624 is configured to generate a MAC on part of information of the license by using the message authentication key, where the part of information of the license includes the content related information, information of the content use rights of the destination entity, and obtained encapsulation key.

The following describes the functions of each module of the cooperating unit 162 in a Marlin system.

The information obtaining module 1621 is configured to obtain content related information, information of the content use rights of the destination entity, and key information of the destination entity from the request receiving unit.

The content key searching module 1622 is configured to find an associated CEK according to the obtained content related information.

The key encapsulating module 1623 is configured to encapsulate the CEK by using the key of the destination entity to obtain an encapsulation key.

The authentication code generating module 1624 is configured to generate a MAC on part of information of the license by using the CEK, where the part of information of the license includes the content related information, information of the content use rights of the destination entity, and obtained encapsulation key.

In an exemplary embodiment, the part of information of the license further includes digital signatures of the RI on the content related information, information of content use rights of the destination entity, and encapsulated CEK. The cooperating unit 162 is further configured to: send the encapsulated CEK to the RI, receive the digital signatures of the RI, and generate a MAC on part of information of the license that includes the digital signatures.

Optionally, as shown in FIG. 16, after the RI sends the license to the destination entity, an embodiment of the present application provides a content issuing device, further including:

a license statistics collecting unit 164, configured to collect statistics about the license issuing information of the RI in an IRO mode or in a mode in which the license issuing information of the RI is reported by the RI and confirmed by the destination entity.

Figure 18:
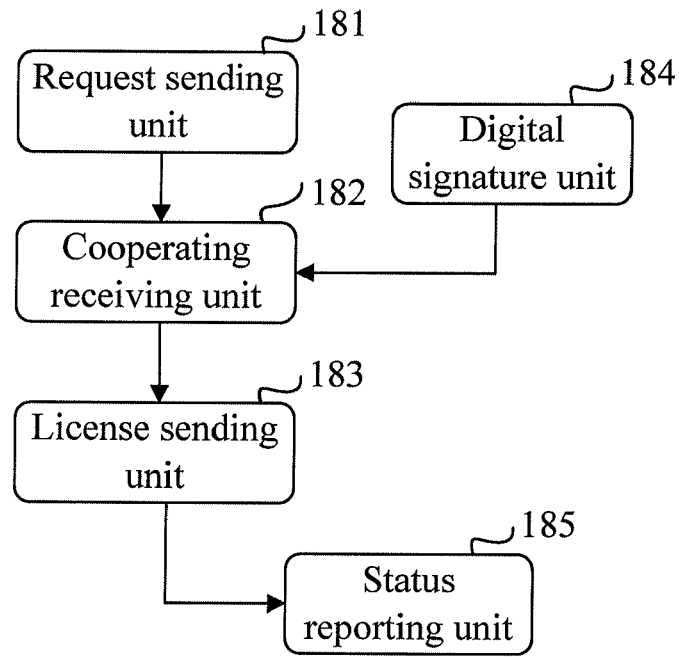
FIG. 18 is a schematic structural diagram of a license issuing device according to an embodiment of the present application.

As shown in FIG. 18, an embodiment of the present application provides a license issuing device, including:

a request sending unit 181, configured to send a Cooperate-RORequest to a CI;

a cooperating receiving unit 182, configured to receive an encapsulation key, which the CI obtains by encapsulating, according to the Cooperate-RORequest sent by the request sending unit 181, content related information and using a key of a destination entity and a MAC that the CI generates on part of information of a license; and a license sending unit 183, configured to the license that includes the MAC and encapsulation key that are received by the cooperating receiving unit 182 to the destination entity.

Preferably, an embodiment of the present invention provides the license issuing device, further including:

a digital signature unit 184, configured to sign on the content related information, information of content use rights of the destination entity, and encapsulated CEK. In this case, the cooperating receiving unit 182 is further configured to receive the MAC that the CI generates on part of information of the license that includes the digital signatures.

Optionally, after the license sending unit 183 sends the license to the destination entity, the license issuing device further includes a status reporting unit 185, configured to send a status report that is confirmed by the destination entity to the CI, so that the CI collects statistics about the license issuing information.

Figure 19:
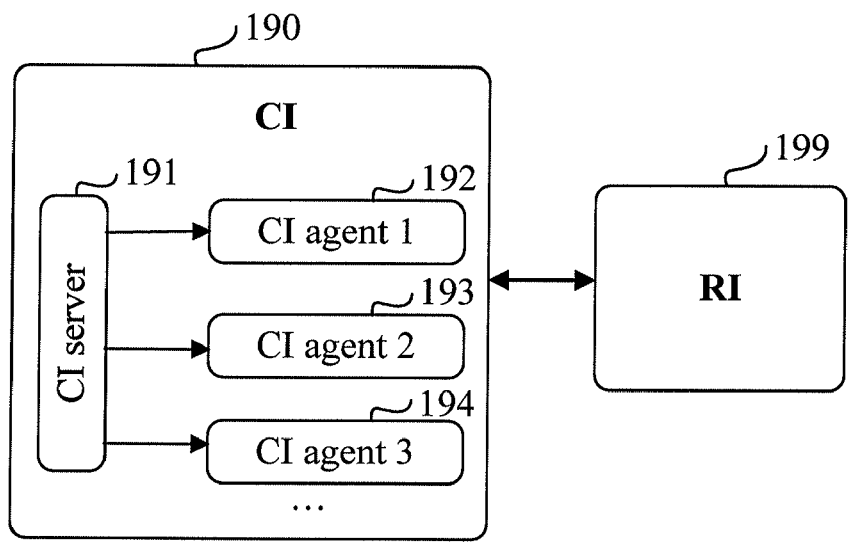
FIG. 19 is a schematic structural diagram of a license issuing system according to an embodiment of the present application.

As shown in FIG. 19, an embodiment of the present application provides a license issuing system, including:

a CI 190, configured to: receive a Cooperate-RORequest from an RI, encapsulate, according to information carried in the Cooperate-RORequest, content related information by using a key of a destination entity to obtain an encapsulation key, generate a MAC on part of information of a license; and send the generated MAC and the obtained encapsulation key to the RI; and the RI 199, configured to: send the Cooperate-RORequest to the CI; receive the MAC and the encapsulation key that are sent by the CI; and send the license that includes the MAC and the encapsulation key to the destination entity.

In an OMA DRM system, the CI 190 is configured to: obtain content related information, information of the content use rights of the destination entity, and key information of the destination entity according to the information carried in the Cooperate-RORequest; find an associated CEK according to the content related information; generate a license encryption key and a message authentication key, encapsulate the CEK by using the license encryption key, and encapsulate the license encryption key and the message authentication key by using the key of the destination entity to obtain an encapsulation key; and generate a MAC on part of information of the license by using the message authentication key, where the part of information of the license includes the content related information, information of the content use rights of the destination entity, and obtained encapsulation key.

In the Marlin system, the CI 190 is configured to: obtain content related information, information of content use rights of the destination entity, and key information of the destination entity according to the information carried in the Cooperate-RORequest; find an associated CEK according to the content related information; encapsulate the CEK by using the key of the destination entity to obtain an encapsulation key; and generate a MAC on part of information of the license by using the CEK, where the part of information of the license includes the content related information, information of content use rights of the destination entity, and obtained encapsulation key.

Preferably, the RI 199 is further configured to generate digital signatures on the content related information, information of content use rights of the destination entity, and encapsulated CEK.

The CI 190 is further configured to: send the encapsulated CEK to the RI, receive the digital signatures of the RI, and generate a MAC on part of information of the license that includes the digital signatures.

To enable flexible deployment and respond to the RI request timely, the CI is divided into a CI server 191 and more than one CI agent (192, 193, 194 . . . ) according to the functional modules. The CI server 191 stores the content information of all licenses and corresponding CEKs, and manages all related information of the CI agents. The CI agents (192, 193, 194 . . . ) store only the content information of the licenses associated with the CI agents and corresponding CEKs, where the managing, by the CI server 191, all the related information of the CI agents includes:

registration and enabling of the CI agent; the CEK obtained by the CI agent; the license issuing control information obtained by the CI agent; the license issuing statistics information that the CI agent reports to the CI server; and security check, configuration change or upgrade of functional modules of the CI agent.

One deployment method is as follows: As shown in FIG. 2, the CI server is deployed on the LAN where the CI is located, and the CI agents are deployed on LANs where different RIs are located. This deployment method is applicable to large-scale CIs or CPs with a lot of contents.

Another deployment method is as follows: As shown in FIG. 13, the CI agent registers with the RI in a plug-in mode, and the CI server generates code signatures on the CI agents of the CI server. This deployment method is applicable to small-scale CIs or CPs. A lightweight solution is used to achieve the same purpose of controlling the RI in issuing a license.

It should be noted that in all the preceding OMA DRM related embodiments, the destination entity is the destination device that receives the license (or a device that the license is issued to or an entity that uses the license). Thus, in the preceding solutions, the destination entity or the destination receiving device is directly referred to as the destination device. In the MARLIN system, the destination entity may be a destination user or a destination device, that is, the destination user node or the destination device node that acts as the license receiver.

It is understandable to those of ordinary skill in the art that all or part of the steps in the preceding embodiments may be implemented by relevant hardware instructed by a program. The program may be stored in a computer readable storage medium. When the program runs, the processes of the preceding methods are executed. The storage medium may be a magnetic disk, a Compact Disk-Read Only Memory (CD-ROM), a Read Only Memory (ROM) or a Random Access Memory (RAM).

Although the present application has been described through some exemplary embodiments and accompanying drawings, the claims are not limited to such embodiments. It is apparent that those of ordinary skill in the art may make various modifications, equivalent replacements, and improvements to these embodiments without departing from the scope of the claims. The modifications, equivalent replacements, and improvements shall fall within the protection scope of the claims.

What is claimed is:

1. A license issuing method, comprising:
   receiving, by a Content Issuer (CI), a Cooperate-RORequest from a Rights Issuer (RI);
   encapsulating, by the CI and according to information carried in the Cooperate-RORequest, content related information by using a key of a destination entity to obtain an encapsulation key, and generating a Message Authentication Code (MAC) on part of information of a license; and
   sending, by the CI, the generated MAC and obtained encapsulation key to the RI, so that the RI sends the license that comprises the MAC and the encapsulation key to the destination entity.

2. The method according to claim 1, wherein the step of encapsulating, by the CI and according to the information carried in the Cooperate-RORequest, the content related information by using the key of the destination entity to obtain the encapsulation key, and generating the MAC on part of information of the license comprises:

obtaining, by the CI, the content related information, information of content use rights of the destination entity, and key information of the destination entity according to the information carried in the Cooperate-RORequest;

finding, by the CI, an associated Content Encryption Key (CEK) according to the content related information;

generating, by the CI, a license encryption key and a message authentication key, encapsulating the CEK by using the license encryption key, encapsulating the license encryption key and the message authentication key by using the key of the destination entity to obtain the encapsulation key; and generating, by the CI, the MAC on part of information of the license by using the message authentication key, wherein the part of information of the license comprises the content related information, information of the content use rights of the destination entity, and obtained encapsulation key.

3. The method according to claim 1, wherein the step of encapsulating, by the CI and according to the information carried in the Cooperate-RORequest, the content related information by using the key of the destination entity to obtain the encapsulation key, and generating the MAC on part of information of the license comprises:

by the CI, obtaining the content related information, information of content use rights of the destination entity, and key information of the destination entity according to the information carried in the Cooperate-RORequest;

finding, by the CI, an associated Content Encryption Key (CEK) according to the content related information;

encapsulating, by the CI, the CEK by using the key of the destination entity to obtain the encapsulation key; and generating, by the CI, the MAC on part of information of the license by using the CEK, wherein the part of information of the license comprises the content related information, information of the content use rights of the destination entity, and obtained encapsulation key.

4. The method according to claim 2, wherein:

the part of information of the license further comprises digital signatures of the RI on the content related information, information of the content use rights of the destination entity, and encapsulated CEK; and the step of encapsulating, by the CI and according to the information carried in the Cooperate-RORequest, the content related information by using the key of the destination entity to obtain the encapsulation key, and generating the MAC on part of information of the license further comprises:

by the CI, sending the encapsulated CEK to the RI;

receiving, by the CI, the digital signatures of the RI; and generating, by the CI, the MAC on part of information of the license that comprises the digital signatures.

5. The method according to claim 1, wherein after the RI sends the license to the destination entity, the method further comprises:

collecting statistics about, by the CI, license issuing information of the RI in an Issuer RO (IRO) mode or in a mode in which the license issuing information of the RI is reported by the RI and confirmed by the destination entity.

6. A content issuing device, comprising:

a request receiving unit, configured to receive a Cooperate-RORequest from a Rights Issuer (RI);

a cooperating unit, configured to encapsulate, according to information carried in the Cooperate-RORequest, content related information by using a key of a destination entity to obtain an encapsulation key, and generate a Message Authentication Code (MAC) on part of information of a license; and a response sending unit, configured to send the MAC generated by the cooperating unit and the encapsulation key obtained by the cooperating unit to the RI, so that the RI sends the license that comprises the MAC and the encapsulation key to the destination entity.

7. The content issuing device according to claim 6, wherein the cooperating unit comprises:

an information obtaining module, configured to obtain the content related information, information of content use rights of the destination entity, and key information of the destination entity from the request receiving unit;

a content key searching module, configured to find an associated Content Encryption Key (CEK) according to the obtained content related information;

a key encapsulating module, configured to: generate a license encryption key and a message authentication key, encapsulate the CEK by using the license encryption key, and encapsulate the license encryption key and message authentication key by using the key of the destination entity to obtain the encapsulation key; and an authentication code generating module, configured to generate the MAC on part of information of the license by using the message authentication key, wherein the part of information of the license comprises the content related information, information of the content use rights of the destination entity, and obtained encapsulation key.

8. The content issuing device according to claim 6, wherein the cooperating unit comprises:

an information obtaining module, configured to obtain the content related information, information of content use rights of the destination entity, and key information of the destination entity from the request receiving unit;

a content key searching module, configured to find an associated Content Encryption Key (CEK) according to the obtained content related information;

a key encapsulating module, configured to encapsulate the CEK by using the key of the destination entity to obtain the encapsulation key; and an authentication code generating module, configured to generate the MAC on part of information of the license by using the CEK, wherein the part of information of the license comprises the content related information, information of the content use rights of the destination entity, and obtained encapsulation key.

9. The content issuing device according to claim 7, wherein:

the part of information of the license further comprises digital signatures of the RI on the content related information, information of the content use rights of the destination entity, and encapsulated CEK; and the cooperating unit is further configured to: send the encapsulated CEK to the RI, receive the digital signatures of the RI, and generate the MAC on part of information of the license that comprises the digital signatures.

10. The content issuing device according to claim 6, wherein after the RI sends the license to the destination entity, the content issuing device further comprises:

a license statistics collecting unit, configured to collect statistics about license issuing information of the RI in an Issuer RO (IRO) mode or in a mode in which the license issuing information of the RI is reported by the RI and confirmed by the destination entity.

11. A license issuing device, comprising:

a request sending unit, configured to send a Cooperate-RORequest to a Content Issuer (CI);

a cooperating receiving unit, configured to receive an encapsulation key, which the CI obtains by encapsulating, according to the Cooperate-RORequest sent by the request sending unit, content related information and using a key of a destination entity, and a Message Authentication Code (MAC) that the CI generates on part of information of a license; and a license sending unit, configured to send the license that comprises the MAC and encapsulation key that are received by the cooperating receiving unit to the destination entity.

12. The license issuing device according to claim 11, further comprising:

a digital signature unit, configured to sign on the content related information, information of content use rights of the destination entity, and an encapsulated Content Encryption Key (CEK); and the cooperating receiving unit, further configured to receive the MAC that the CI generates on part of information of the license that comprises the digital signatures.

13. The license issuing device according to claim 11, wherein after the license sending unit sends the license to the destination entity, the license issuing device further comprises:

a status reporting unit, configured to send a status report that is confirmed by the destination entity to the CI, so that the CI collects statistics about license issuing information.

* * * * *